INVENTORS
SEIJI SUMIMOTO
MORIO SUMIMOTO

BY OSTROLENK, FABER, GERB & SOFFEN

ATTORNEYS

United States Patent Office 3,395,803
Patented Aug. 6, 1968

3,395,803
APPARATUS FOR FILTRATION OF LIQUIDS IN CONTAINER
Seiji Sumimoto, Tokyo, and Morio Sumimoto, Yokohama, Japan, assignors to Sumimoto Scientific Institute Co., Ltd., Tokyo, Japan
Filed Mar. 3, 1966, Ser. No. 531,563
Claims priority, application Japan, Mar. 5, 1965, 40/12,624
7 Claims. (Cl. 210—122)

ABSTRACT OF THE DISCLOSURE

A fluid filter assembly having a cylindrical filter medium submerged within liquid in a container. The filter medium is vertically expandable and collapsible with the top secured to a float and the bottom to a support. The filter medium is subject to expanding and collapsing in response to changing liquid level.

This invention relates to the filtration of liquids, and more particularly it relates to improved means for filtering a liquid fluid in a container.

The liquid fluid in a container is conventionally tapped off at the bottom opening. The liquid fluid stored in a container often includes impurities or solid particles which are generally heavier substances that settle to the bottom of the container with the lapse of time. If the settled solid substances are drawn off from the bottom of the container together with the liquid fluid, the solid substances clog the conduits or valves employed in the carrying of the fluid and to damage the pumps or other machines to which the liquid fluid is fed. Drinking water in a tank sometimes includes harmful solid particles which should not be ingested. In some chemical processes, either the clarified fluid or the solid particles removed from the fluid may be the desired product. The filtration of a liquid fluid which is stored in a container, is one of the most important problems to be solved in the industries and for our lives.

The solid particles in a liquid fluid are removed by the use of a filter medium that permits the fluid to pass through but retains the solid particles. The fluid to be filtered will pass through the filter medium if some driving force is applied. This force may be caused by gravity, centrifugation, application of pressure on the fluid above the filter or application of vacuum below the filter or by a combination of such force.

The gravity filter is the oldest and simplest type. But a container seldom has a room for the provision of thick filter beds. Centrifuges containing a bowl with a porous filter medium may be considered as filters in which gravitational force is replaced by centrifugal force many times greater than gravity. However, centrifuges are difficult to install in liquid containers.

Pressure or vacuum filters usually are used in industry in preference to gravity filters. The driving force that can be supplied by pressure or vacuum is much greater than gravity, thus permitting higher filtration rates. However, pressure or vacuum filters have the disadvantage of being expensive to construct, and must be always connected to the sources of pressure or vacuum.

Conventional filters are designed to press the whole liquid fluid by force against the filter medium. Such a device will thus needlessly filter the heavier solids which would be separated, by precipitation, from a clear effluent. If the filter medium is covered with a layer of soft particles the rate of filtration will decrease.

Conventional filters have the further objectionable characteristic that the filter units soon become plugged with solid particles due to the high pressure acted upon the small pores of the filter medium. Thus the filter units must be replaced frequently to maintain a clean filter. Gravitational force or other driving forces cause the deposition of a filter cake on the filter medium. If the filter cake is gelatinous or the particles are soft and compressible, rather than firm, the filter cake may blind; i.e., the pores in the cake may close and stop filtration.

The inventors have found that, if a colloidal solution is filtered by a large driving force, there often exists many particles of which the diameter is larger than the pores of the filter medium in the filtrate. This is due to the fact that the hydrogel of the liquid fluid turns into the hydrosol condition when it passes through the pore of the medium under high pressure, thus the filtered colloidal particles coagulate to increase the particle size. If this happens the filtration will not attain its object.

One feature of the present invention, therefore, resides in the provision of an improved filter means for a liquid container comprising a hollow body of filter medium provided with a means to float the filter body in the liquid fluid to be filtered, the clear effluent being introduced into the filter body through the small pores of the filter medium whereby the filtrate is drawn off from the filter body while the solid particles settle by gravitation to the bottom of container without depositing on the surface of the filter medium. The flow or filtration of liquid fluid is governed by the difference in head between the liquid in the contained and the filtrate in the filter body. According to the invention, the liquid fluid may be filtered without giving such a large driving force as to cause the filter medium to be plugged with the solid particles.

An object of the invention is to provide a buoyant filter which is submerged in the liquid to a certain depth and which moves automatically up and down in accordance with the rise and descent of the liquid level whereby the filter area is maintained to fixed dimensions regardless of the change in the liquid level.

Another object of the invention is the provision of a filter means for a liquid container comprising a hollow body of filter medium having means to lengthen and shorten the body without changing the mesh size of the medium in accordance with the rise and descent of the liquid level.

A still another object of the invention is to provide improved means for the continuous filtration of large quantities of liquid fluid of high content of suspended solids.

A further object of the invention is to provide a great filter area for the liquid fluid stored in a container so as to almost equalize the hydrostatic pressure on the two sides of the filter, thus allowing free passage of filtrate into and out of the room enclosed with the filter medium by the molecular motion of the liquid phase. By the selection of a suitable medium, it is possible to provide very efficient filters for the filtration of colloidal solution.

A still further object of the invention is to provide a buoyant filter having means for giving vibration or intermittent shocks to the filter to shake off the particles which have adhered to or closed the pores of filter medium to continuously or intermittently recover a non-blinded surface to the liquid fluid.

The filters of the present invention may be formed with suitable materials in accordance with the liquid fluid to be filtered. It is preferred to use a thin barrier, exemplified by a filter cloth, filter screen, porous metal sheet, woven wire screen of appropriate mesh size. The openings in the barrier are not always required to be smaller than the particles to be removed from the fluid. By the use of two or more layers of such barrier, the fluid may be effectively filtered. For the filtration of a colloidal solution, semi-permeable membranes (e.g., animal bladders) or cellophane sheets may be used.

The shape of the filter according to the invention is not critical, but it is advisable to provide a cylindrical filter body of large diameter. The body may include both geometrical cylinders as well as prisms. The important point is to provide as large a filtration surface area as possible and to give the filter body elasticity or flexibility without changing the mesh size.

For other objects and for a better understanding of the invention, reference may be had to the following detailed description taken in connection with the accompanying drawing, in which.

Figure 1:
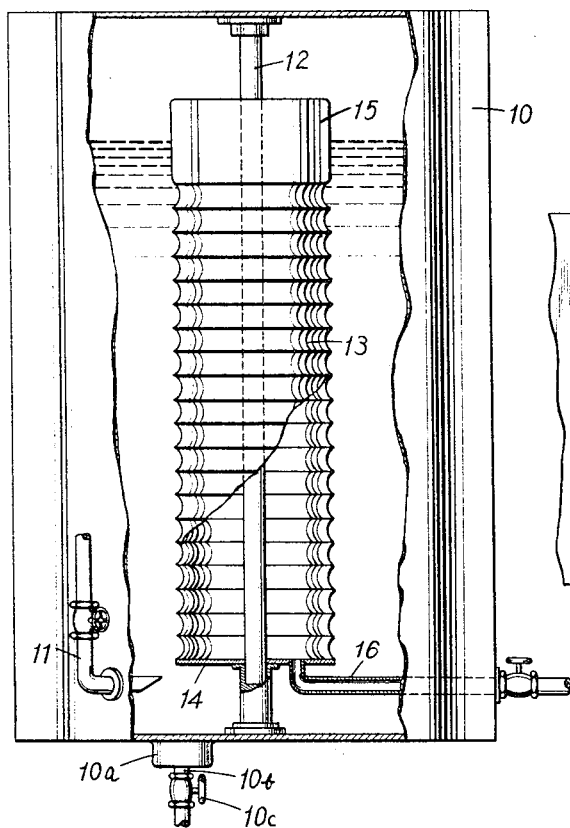
FIG. 1 is a diagrammatic side elevation, with parts cut away, showing one embodiment of filter suitable for use in the continuous filtration of liquid fluid introduced into a tank.

In the preferred form of the invention shown in FIG. 1, the apparatus comprises an upright cylindrical, closed tank 10 having a conduit 11 for the supply of a liquid fluid to the tank. The tank may be any desirable size and form, and as a typical illustration the bottom of which tank is in the form of a sump forming wall 10a, which collects settled material which may be drawn off from time to time through a pipe 10b having a control valve 10c therein.

A vertical shaft 12 is secured positioned in the tank 10 between the bottom and ceiling thereof. Placed vertically in spaced relation to the shaft 12 is a cylindrical bellows 13, the lower end plate 14 of which bellows is water-tightly fixed to the shaft. The upper end of bellows 13 is connected water-tightly to the under side of a circular float 15 which encircles the shaft 12. The float 15 acts to keep the bellows in its upright position. Thus the bellows 13 expands and contracts in accordance with the rise and descent of the liquid level.

The bellows 13 is made of a filter medium suitable for the filtration of the liquid fluid in tank 10. It should be noted that the bellows filter 13 expands and contracts in accordance with the rise and descent of the liquid level, however, the pores of the filter remain at the predetermined mesh size. Thus only the clear fluid passes through the bellows, filter 13 retaining the solid particles. The solid particles settle to the bottom of tank 10.

The clear liquid which enters bellows filter 13 is carried off by way of pipe 16, opening through the lower end plate 14 of the bellows, to the outside of tank 10.

The speed of outflow of the liquid or the filtration rate is regulated by the discharge rate into pipe 16 according to the diameter of the pipe, so that it is advisable to provide a large surface area to the bellows filter 13. Thus a high surface area of the bellows filter 13 relative to the cross section of pipe 16 provides exceedingly efficient filtration of the liquid fluid treated.

By the arrangement shown, clear liquid is drawn off from the pipe 16. If the tank 10 is a drinking water tank, clear water is always obtained from the pipe 16. When the tank 10 is used as the fuel tank of an internal combustion engine, its fuel pump is always supplied with clarified fuel. In case the tank of the invention is employed in a lubrication system, such as a lubricant oil dispenser, the filter serves to remove foreign matters from the oil. The tank of the invention is also employed in the production of chemicals in some processes to recover the fluid filtrate and the solid filter cake. The fluid filtrate is withdrawn from the pipe 16; and the filter cake and precipitates are discharged continuously from the bottom pipe 10b.

Figure 2:
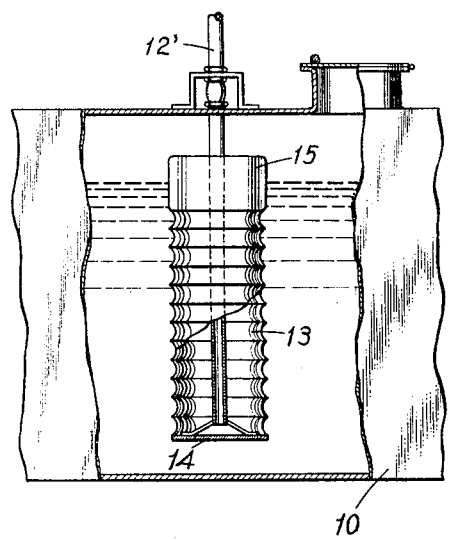
FIG. 2 is a fragmentary sectional view of a filter adapted to treat the liquid fluid which is stored in a large tank installed under the ground.

Referring to FIG. 2 of the drawings, like reference characters designate like parts as shown in FIG. 1. However the tank 10 of this second embodiment is embodied as the underground storage tank for a gasoline station. A vertical hollow shaft 12' extends downwardly through the top wall of tank 10 into the tank. The lower end portion of shaft 12' supports the lower end plate 14 of a bellows filter 13 in such manner that the plate 14 is positioned at a place spaced from the bottom wall of tank 10. Connected to the upper end of bellows filter 13 is a float 15 which encircles the shaft 12' and acts to keep the bellows filter 13 in its upright position as shown. Thus clarified fuel is pumped from the storage tank 10 through hollow shaft 12'. By the arrangement shown, meters for the fuel would not be damaged by the dust which might be entered into the storage tank 10. Thus, clear fuel is always supplied to the user.

Figure 3:
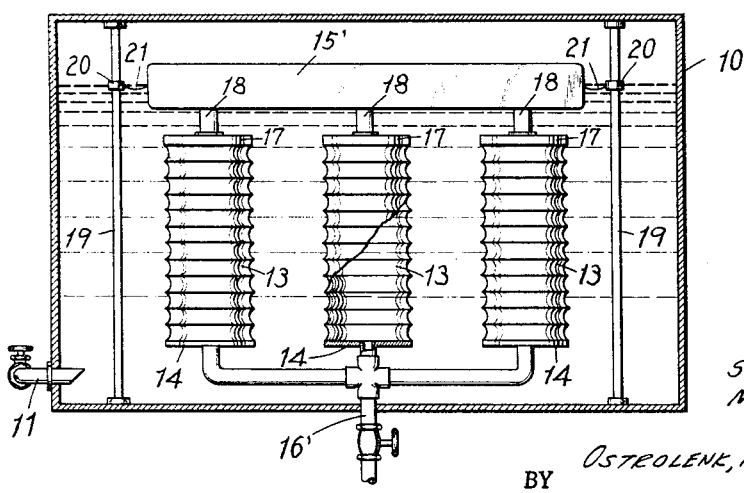
FIG. 3 is a similar view to FIG. 1, but showing a slightly modified embodiment of the filter apparatus.

Referring to FIG. 3 of the drawings, in which like reference characters again designate like parts as shown in FIGS 1 and 2. This third embodiment is advantageously used to treat large quantities of the liquid fluid with high content of impurities or of colloidal solution. The tank 10 of FIG. 3 is provided with a plurality of bellows filters 13, having lower end plate 14 and upper end plate 17, respectively. The lower end plate 14 in each bellows filter 13 has an opening communicating with a fixed manifold 16' at the bottom of tank 10, whereas the upper end plate 17 in each bellows filter is connected securely to a float 15' by means of a rod member 18, in each instance. The tank 10 has several posts 19, which each carry loosely a buoyant ring 20. The rings 20 are adapted to anchor the float 15' by means of cables 21. By the arrangement as shown, a large filtration area is obtained and the filtrate which enters each bellows filter is collected and carried off by manifold 16'. The bellows filters 13 in this embodiment are movable transversely together with float 15' if a lateral force is given manually or by proper mechanical means. This lateral force produces vibration which shakes off the solid particles or colloidal particles plugged in the pores of the filter. Thus the bellows filters 13 can be restored to a non-blinded surface.

The bellows filter of the invention may be covered with a layer or precoat of filter aid; or the filter aid is added to the liquid fluid, if the filter cake is extremely compressible, gelatinous or slimy and tends to blind the filter.

It will be seen that by our invention a highly efficient filtration apparatus is provided which is compact and which, by selecting a proper filter medium, produces completely filtered liquid. The only moving parts are float and bellows filter which are inexpensive to manufacture and maintain.

According to the invention the liquid fluid in a container is prevented from carrying with it any impurities or solid particles that are floating in the fluid. The filtration in accordance with the invention is effected without such a large driving force as to blind the filter and stop the filtration, therefore the filter can stand long use.

While we have described but three forms of the invention, it is to be understood that other forms, modifications and adaptions can be made all falling within the scope of the claims which follow.

What we claim is:

1. An apparatus for the gravity filtration of liquids within a container comprising:
 (a) at least one hollow vertically oriented body of a filter medium; said body being collapsible and expandable about its vertical axis while substantially maintaining its horizontal cross section;
 (b) means establishing a liquid level within the container;
 (c) means for supporting said body and for maintaining the same in an upright position within the liquid to be filtered in said container;
 (d) a floatation means slidably mounted on said supporting means; said floatation means being connected to the filter medium to maintain the filter medium below the surface of the liquid in the container;

(e) said floatation means, said support means and said filter medium being so constructed and arranged that the filter medium collapses and expands about its vertical axis in response to changing liquid level;

(f) conduit means for filtered liquid leading from the inside of said hollow body to the outside of said container; and (g) conduit means located substantially at the base of the container for the withdrawal of sludge.

2. The filtration apparatus of claim 1, in which said hollow body is capable of expansion and contraction without change of pore size in the filter medium thereof.

3. The filtration apparatus of claim 1, wherein said hollow body is elastic and including float means for supporting said hollow body and for effecting vibration of said body.

4. The filtration apparatus of claim 1, in which said hollow body comprises a cylindrical bellows, the lower end of which is closed and which is spaced from the bottom of said container, and including float means connected to the upper end of said bellows.

5. The filtration apparatus of claim 4, in which the lower end of said bellows possesses a water-tight seal and in which said conduit means has an inlet opening within said bellows adjacent the lower end portion thereof and an outlet opening outside of said container.

6. The filtration apparatus of claim 4, wherein said bellows is supported by a hollow shaft through which the fluid within the bellows is withdrawn from said container.

7. The filtration apparatus of claim 1, comprising a plurality of hollow bodies, each of which is provided in the form of a cylindrical bellows constituted of a filter medium, the upper and lower ends of each said bellows having a water-proof seal; a manifold communicating with the inside of each said bellows; a float connected to the upper end of each bellows; and means for anchoring said float to maintain said bellows in their upright position within the fluid to be filtered.

References Cited

UNITED STATES PATENTS

| | | | |
|---|---|---|---|
| 367,576 | 8/1887 | Allen | 210—242 |
| 1,647,808 | 11/1927 | Neumann | 210—242 |
| 1,696,313 | 12/1928 | Liddell | 210—356 |
| 2,347,092 | 4/1944 | Evans | 210—323 X |
| 2,460,084 | 1/1949 | Hebo | 210—356 |
| 2,788,125 | 4/1957 | Webb | 210—242 X |
| 3,109,812 | 11/1963 | McAulay et al. | 210—242 |
| 2,935,196 | 5/1960 | Miller | 210—122 X |

FOREIGN PATENTS

| | | |
|---|---|---|
| 502,773 | 12/1954 | Italy. |

REUBEN FRIEDMAN, *Primary Examiner.*

C. DITLOW, *Assistant Examiner.*